United States Patent [19]
Stoll et al.

[11] Patent Number: 4,876,945
[45] Date of Patent: Oct. 31, 1989

[54] PISTON AND CYLINDER UNIT

[75] Inventors: Kurt Stoll; Lothar Müller, both of Esslingen, Fed. Rep. of Germany

[73] Assignee: Festo KG, Esslingen, Fed. Rep. of Germany

[21] Appl. No.: 257,387

[22] Filed: Oct. 13, 1988

[30] Foreign Application Priority Data

Oct. 13, 1987 [DE] Fed. Rep. of Germany ....... 3734547

[51] Int. Cl.$^4$ .................... F01B 25/26; F01B 31/12
[52] U.S. Cl. ............................. 92/5 R; 91/1; 91/DIG. 4; 403/296
[58] Field of Search ............... 92/5, 13.41, 13.8, 59, 92/108, 109, 113, 114; 493/296, 292, 307, 308, 299; 91/1, DIG. 4

[56] References Cited

U.S. PATENT DOCUMENTS

| | | | |
|---|---|---|---|
| 2,584,926 | 2/1952 | Roll | 92/109 |
| 2,956,549 | 10/1960 | Malpass | 92/110 |
| 3,147,671 | 9/1964 | Geyer | 92/109 |
| 3,163,093 | 12/1964 | Gut | 92/109 |
| 3,166,991 | 1/1965 | Blenkle | 92/109 |
| 3,401,604 | 9/1968 | Blatt et al. | 92/114 |
| 3,729,219 | 4/1973 | Crane | 403/296 |
| 4,003,297 | 1/1977 | Mott | 92/109 |
| 4,296,677 | 10/1981 | Little et al. | 92/108 |
| 4,342,634 | 8/1982 | Haasl et al. | 91/422 |
| 4,759,263 | 7/1988 | Lehle | 92/59 |

FOREIGN PATENT DOCUMENTS

| | | | |
|---|---|---|---|
| 630147 | 5/1982 | Switzerland | 92/5 R |
| 2056692 | 3/1981 | United Kingdom | 92/5 R |

Primary Examiner—Robert E. Garrett
Assistant Examiner—Thomas Denion
Attorney, Agent, or Firm—McGlew and Tuttle

[57] ABSTRACT

The invention provides a piston and cylinder unit comprising a piston adapted to be displaced in the axial direction, a piston rod arranged coaxially and connected with the piston on at least one axial face thereof and which extends through an associated cylinder end cover in a sealing and sliding manner. The section of the piston rod outside the piston are provided with load attachment means. The piston rod is tubular and defines a continuous bore extending essentially from one end of such rod to the other end thereof in the axial direction. The bore is provided at least at its end sections with a female threaded section. The piston end of the piston rod is provided with a threaded part connected with the piston and in the opposite external end the male threaded section of a connecting part may be screwed with is adapted to be coupled with a load attachment means to be operated by said piston and cylinder unit.

21 Claims, 2 Drawing Sheets

PISTON AND CYLINDER UNIT

BACKGROUND OF THE INVENTION

The invention relates to a piston and cylinder unit comprising a piston adapted to be displaced in the axial direction, a piston rod arranged coaxially and connected with the piston on at least one axial face thereof and which extends through an associated cylinder and cover in a sealing and sliding manner, the section of the piston rod outside the cylinder being able to be connected with load attachment means.

In the prior art piston and cylinder units have been designed so that the piston rod is made of solid material and for fixation of the piston and of the load attachment means the two axial ends of the piston rod have male threads cut into them. The consequence of this is a relatively high weight of the piston rod and this increases inertia and means that high piston acceleration is not possible in all cases. Furthermore it is a disadvantage that for matching different load attachment means and different pistons it is necessary to have different piston rods which have different sizes of male thread so that in order to provide for a reasonably wide range of products extensive stockholding and high warehouse costs are involved. If furthermore the threaded piston rod sections are to have a high strength, the entire piston rod has to be made of high quality steel, something that very considerably increases the costs of production.

SUMMARY OF THE INVENTION

Accordingly one object of the present invention is to provide a piston and cylinder unit of the initially described type, which makes possible a higher piston acceleration.

A further aim of the invention is to reduce production costs.

A still further object of the invention is to increase the flexibility of application of the cylinder and piston unit.

In order to achieve these or other objects, the piston rod is in the form of a tube having a cylindrical bore extending therethrough in the axial direction from end to end and which at the two axial ends is provided with a respective female thread section, the piston end of the piston rod being provided with a thread part connected with the piston and the opposite, external end of the piston rod being adapted to have an external thread part of the load attachment means screwed into it.

The hollow, sleeve-like piston rod means that it is possible to achieve a saving in weight, which substantially reduces the mass of the parts to be moved when they are in their operational state so that there are higher acceleration rates during displacement while at the same time reducing the pressure required. Furthermore it is now possible to keep the price of the piston rod to within reasonable limits even when high quality materials are used for the rod. Furthermore the invention makes possible adaptable production of the piston and cylinder unit since while the stockholding requirement is reduced a wide product range becomes possible, because for adaptation to different piston sizes or different load connection means it is possible to use one and the same design of piston rod, which only has to be furnished with the suitably adapted threaded or connection part as is required. The piston rod in fact is thus in practice provided with replaceable connecting threads, which furthermore may be made with different thread standards (and not only different sizes) such as metric or inch threads.

The threaded part on the piston may be made integrally with the piston, as for instance in the form of a threaded stud formed in the piston. However, a higher degree of adaptability is achieved if the threaded part is connected detachably with the piston for its part. In this case the threaded part, and the connection part as well for instance, may be made in the form of a ferrule (i. e. a short tubular structure) having two coaxial threaded sections which are placed in succession in the axial direction, it being convenient to have a respective screw-in collar somewhere between them so that the one threaded section is in each case screwed to the piston rod and the other threaded section is screwed to piston or to the load connecting means. It is an advantage if the two female threaded sections have the same diameter and the same type of thread so that during production it is not necessary to retool. If the bore is provided with a female thread from end to end, production becomes still more rational, since the different piston rods only have to be cut off to the desired length from a suitable tube with a female thread.

However it is also possible to have the female threaded sections with different diameters and/or thread standards.

If the connecting means on the piston and/or and load connecting means do not match, then it is preferred for the design to be such that the threaded sections (of the treaded part and/or of the connecting part) to be screwed to the piston and, respectively, the load attachment means to be have a different diameter and/or a different screw thread standard to that of the associated thread section to be screwed to the piston rod.

A substantial saving in weight with respect to the piston rod is achieved if it is made of light alloy and more especially of aluminum. The connecting part and/or the threaded part itself may be fashioned of a steel alloy as for example more especially X20 Cr13 steel, which has provided to be particularly satisfactory.

A particular advantage of the piston and cylinder unit in accordance with the invention is to be seen in the possibility of integration of a switching means responding to the position of the piston or of the piston rod. In this case the cylindrical bore of the tubular piston rod, which is present in any case, serves to receive at least one permanent magnet, which moves with the piston rod. It may cooperate with a plurality of switches arranged externally of the cylinder, which are located adjacent to the piston rod and are operated by the field of a magnet in the piston rod as the magnet moves past. In this way it is possible to detect the terminal positions of the piston, for instance to detect certain intermediate stroke positions so that operating signals are produced when the piston rod is in such positions. In this respect the magnets are preferably so mounted in the piston rod that they may be adjusted in the axial direction. The adjustability may more especially be provided for by making the magnets with a male thread so that when in the bore of the piston rod having a female thread the magnets may be adjusted by turning them. In accordance with a further embodiment of the invention the magnets are to be arranged in an axially sliding manner in the piston rod and in order to prevent unintentional displacement during operation of the system the magnets may be provided with locking members, as for example in the form of a circumferentially placed rubber bands or a spring ring, which presses against the inner bore surface of the rod, which in this case is plain. In both the possible forms of the invention the position of the respective magnets may be readjusted without taking the piston and cylinder unit to pieces, that is to say simply by unscrewing the connecting part so that the bore of the piston rod is accessible.

In what follows an account will be given of the invention in more detail referring to the accompanying drawings.

LIST OF THE SEVERAL VIEWS OF THE DRAWINGS

DESCRIPTION OF THE PREFERRED EMBODIMENTS

Figure 1:
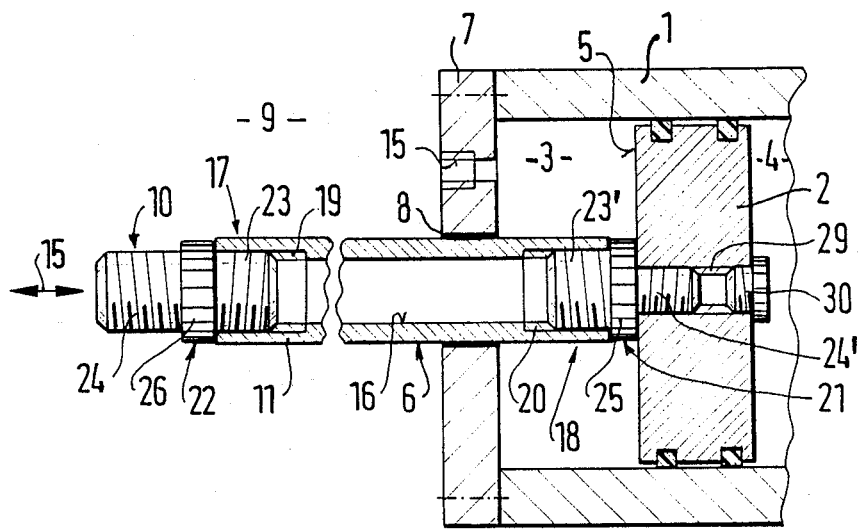
FIG. 1 is a partial longitudinal cross-sectional view of a first embodiment of a piston and cylinder unit in accordance with the invention.

As will be seen from the figures the piston and cylinder unit in accordance with the invention comprises a cylinder 1, in which a piston 2 is located dividing the cylinder 1 into two piston spaces 3 and 4 and which is able to slide in the axial direction. On one axial face 5 of the piston 2 the piston is attached to a coaxial piston rod 6, which extends in the axial direction slidingly through the associated cylinder end cover 7 in a supporting and sealing arrangment 8 with a sealing effect to the outside. The free end part 10 of the piston rod section 11 located outside the cylinder 1 is able to be linked with a load attachment means 14, as for example the moving slide of a machine as is diagrammatically shown in FIG. 2. By charging and venting the piston spaces 3 and 4 via suitable ports 15 the piston 2 and the load attachment means 14 connected with the piston rod 6 may be moved in the axial direction as indicated by the double arrow 15 in a reciprocating manner.

In accordance with the invention the piston rod 6 is tubular and has a cylindrical bore 16 extending through from end to end, i. e. it extends continuously. Thus in the case of the piston rod it is a question of a hollow cylindrical member whose cross section is circular in the illustrated example both as regards the outer and also the inner periphery. At its two axial end parts 17 and 18 the piston rod 6 is provided with a female thread section 19 and 20, respectively, such thread being machined into the inner surface of the bore 16. A threaded part 21 connected to the piston 2 is screwed into one of these sections 19 and 20 and at the opposite end 17 of the piston rod a connecting means 22 is screwed into the said bore, both such parts having a complementary male threaded section 23 and 23'.

The threaded part 21 adjacent to the piston is for its part detachably connected with the piston 2, it being screwed thereto in the present working example of the invention. For this purpose the threaded part 21 has the form of a ferrule, which at its two axial end parts bears respective threaded sections 23' and 24', which are coaxial in relation to each other and are located on opposite sides of a screw-in collar 25. The outer form of such collar is so shaped that a turning tool such as a spanner may be used therewith.

The threaded section 24' of the threaded part 21 remote from the piston rod 6 is screwed into a complementary threaded hole 29 in the piston 2. In this respect it may be a question of a blind hole or however, as in the case of the embodiment shown in FIG. 1, it may be a question of a through hole, which at its other end is best shut off by a threaded plug 30.

In the case of a further embodiment of the invention, not illustrated, the threaded part is made in one piece with the piston and may in particular be in the form of a cylindrical threaded projection thereon.

As regards its geometry the connection part 22 is the same as the threaded part 21. In this case as well the threaded part 23 is axially adjoined by a screw-in collar 26 which in the screwed-in state abuts the end face of the piston rod and which is followed in the axial direction by a further threaded section 24. With the aid of a nut 31 the load attachment means 14 may be readily fitted to the piston rod, see in this respect FIG. 2.

In order to enable simple, rapid and low-price production to take place it is to be recommended that the female threaded sections 19 and 20 be made with the same thread diameter and with the same thread standard. As a result no retooling is needed. In the working example of the invention as shown in FIG. 1 the threaded sections 19 and 20 only extend a little into the interior of the bore 16, while in the case of the outer working example illustrated in FIG. 2 they are only formed by the end parts of a female thread 32 running from end to end of the piston rod 6, that is to say the bore 16 thereof. This last embodiment of the invention has the advantage that the threaded sections 19 and 20 are able to produced in a single working step, it being convenient if running lengths of tube stock already provided with an internal thread are used so that the individual piston rods may be cut off from it with the required dimensions. The advantage of the working example of FIG. 1 is in this respect also the fact that the female threaded sections 19 and 20 may if required be made with different diameters and/or different thread standards.

The hollow piston rod also leads to a reduction in the masses to be moved during operation of the system so that initial response is improved and in particular higher acceleration figures are possible. This effect may be even further increased if the piston rod is made of a light metal, as for example of aluminum or an alloy thereof; owing to the saving in material the piston rod is no more expensive than conventional ones. At any event it is possible for the connecting and/or threaded parts 22 and 22 to be made of high quality material, as for instance stainless steel such as X20 Cr13 steel.

A great advantage of the system in accordance with the present invention is that for adaptation of the respective piston rod to suit different pistons and/or load attachment means connecting or threaded parts 22 and 21 respectively may be utilized whose threaded sections 24 an 24' remote from the piston rods are different in regard of their dimensions and/or thread type. Differences may in this respect exist both with respect to the threaded section 23 and 23' at the piston end and also between the two outer threaded sections 24 and 24'. For this reason there is no possibility of any problems in international trade, for an adaptation to other types of load attachment means may be excluded in case of need by replacing a connecting part with a metric male threaded section 24 by one with a male section 24 having inch thread, and vice versa.

Moreover it is to be pointed out that in place of the male threaded section 24 of the connecting part 22 it is also possible to have another design of a fixing or securing means. The design thereof only depends on the form of the respective load attachment means 14.

Figure 2:
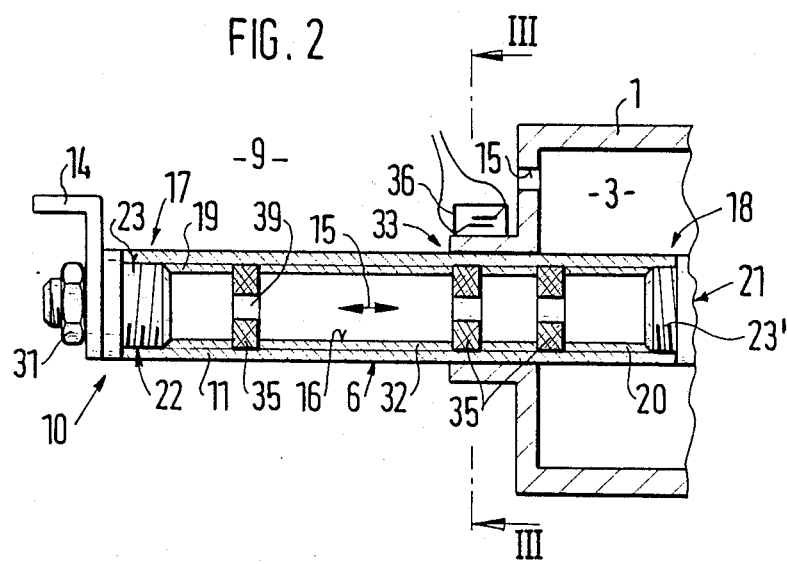
FIG. 2 is a partial longitudinal section of another embodiment of the piston and cylinder unit in accordance with the invention with a magnetically operated switch.
Figure 3:
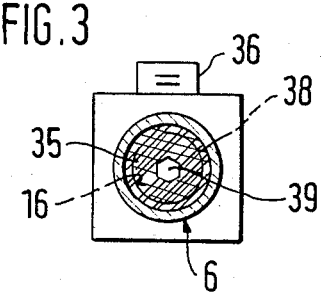
FIG. 3 is a section taken through the system of FIG. 3 along the line III—III.

A further advantage of the piston and cylinder unit in accordance with the invention is to be seen in FIGS. 2 through 5, in which the piston rod bore 16 is used for the provision of a magnetic switching means 33. The cylindrical bore 16 of the tubular piston rod 6 forms a receiving opening 34 for at least one moving permanent magnet 35, which cooperates with a switch 36 arranged externally on the cylinder. In the working example of the invention shown in FIG. 2, the switch 36, which is preferably in the form of a reed switch, is mounted on the molded part 37, surrounded the piston rod, of the cylinder end cover 7 and is thus directly adjacent to the piston rod 6. If the piston rod 36 is moved in the axial direction 15, the switch 36 will be actuated by the magnetic field of the permanent magnet 35 moved past it. As shown in FIG. 2 it is also possible to have further such permanent magnets placed one after the other in axial succession so that switching takes place at certain positions of the piston and piston rod, such switching for instance indicating the terminal settings or certain intermediate positions along the piston stroke. Via the switch 36 it is then possible for various functions to be performed. Furthermore, it is possible to have more than one such switch.

In the illustrated working examples of the invention the permanent magnets 35 are able to be moved in the axial direction and may be arranged at different positions along the bore 16. This increases the adaptability of the switching system. For instance the permanent magnets 35 are in the form of circular disks in the embodiment of the invention shown in FIG. 2 having a continuous female thread from end to end and on their outer peripheries such magnets are provided with an external thread, which cooperates with the female thread 32. In a central position they possess a continuous hexagonal bore 39, which when the connecting part 22 has been removed, makes it possible to adjust the individual magnets by turning them in the bore 16 using a suitable hex key. In order to lock them in place the magnets are preferably arranged in a plastic casing, not shown, which has the male thread 38 thereon and locks the magnet in place by a gripping effect.

Figure 4:
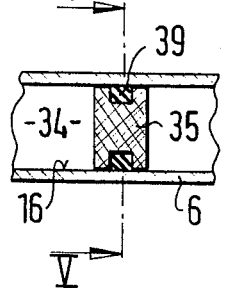
FIG. 4 is a detailed longitudinal section through a piston rod with longitudinally adjustable permanent magnets in accordance with the invention.
Figure 5:
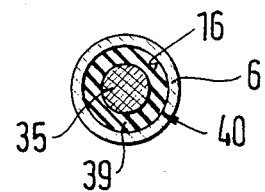
FIG. 5 is a cross-section taken through the piston rod of the system of FIG. 4 along the line V—V.

In the case of the working example of the invention shown in FIGS. 4 and 5 the adjustment of the position of the permanent magnets 35 is simply performed by longitudinal displacement along the bore 16. For this purpose the magnets have a peripheral groove, preferably on their outer faces, in which there is an annular locking member 39 or sprag, which may be made for instance of resin or in the form of a rubber ring, which makes frictional contact with the wall of the bore 16. Or it is possible to have slotted spring ring, which presses against the wall of the bore to locate the magnet.

While specific embodiment of the invention have been shown and described in detail to illustrate the application of the principles of the invention, it will be understood that the invention may be embodied otherwise without departing from such principles.

We claim:
1. A piston and cylinder unit comprising:
a cylinder,
a piston arranged inside and being axially displaceable relative to said cylinder;
a cylinder end cover at one end of said cylinder, said end cover having a hole;
a tubular rod having a load end and a piston end, said rod having a bore extending substantially from said load end to said piston end, said bore having femle threads extending from each of said ends toward the other of said ends, said rod piston end being threadably engaged to said piston, said rod and projecting away from said piston and extending through said end cover hole, said rod load end being threadably engaged to a load attachment means for attaching said rod to a load, said bore being adapted to receive a permanent magnet moving with said rod;
a switch arranged adjacent said cylinder and cooperating with said magnet, said magnet being fixedly connected with male threads and said male threads being threadably engaged with said female threads of said bore, said magnets being axially adjustable in said bore by turning said magnets.
2. A piston and cylinder unit according to claim 1, wherein said magnet has a circular disk shape.
3. A piston and cylinder unit according to claim 1, wherein said bore extends through said rod and said female thread is continuous and extends along the length of said bore.
4. A piston and cylinder unit according to claim 1, further comprising a plastic casing encasing said magnet, said plastic casing having male threads thereon which lock the magnet in place by a gripping effect.
5. A piston and cylinder unit according to claim 1, wherein said switch is arranged adjacent said cylinder end cover.
6. A piston and cylinder unit according to claim 1, wherein said switch is a reed switch.
7. A piston and cylinder unit according to claim 1, wherein said piston includes a male thread extending from said piston and being formed integrally with said piston, said male thread being threadably engaged with said rod piston end female
8. A piston and cylinder unit according to claim 1, further comprising a threaded section having male threads, said piston having a bore with female threads, said threaded section being threadably engaged with said piston female threads and being threadably engaged with said rod female threads, thereby connecting said rod to said piston.
9. A piston and cylinder unit according to claim 1, further comprising a ferrule having two co-axial threaded sections threadably engaged with said piston, a second ferrule having two co-axial threaded sections threadably engaged with said rod female threads, a screw-in collar threadably engaged with each of said first ferrule and said second ferrule and thereby connecting said piston with said rod.
10. A piston and cylinder unit according to claim 1, wherein said female thread on said rod load end has a different diameter than said female thread on said rod piston end.
11. A piston and cylinder unit according to claim 1, wherein said female thread on said rod load end has a different thread standard than said female thread on said rod piston end.

12. A piston and cylinder unit according to claim 1, wherein said female thread on said rod load end and said female thread on said rod piston end have the same diameter.

13. A piston and cylinder unit according to claim 9, further comprising a third and a fourth ferrule each having two co-axial threaded sections, said third ferrule being threadably engaged with said load attachment means, said fourth ferrule being threadably engaged with said rod load end female threads, a second screw-in collar threadably engaged with each of said third and fourth ferrule.

14. A piston and cylinder unit according to claim 13, wherein the threads of said first and second ferrule are one of a different diameter and a different thread standard than the threads of said third and fourth ferrule.

15. A piston and cylinder unit according to claim 1, wherein said rod is made of a light alloy.

16. A piston and cylinder unit according to claim 14, wherein one of said ferrules and said screw-in collars are made of stainless steel.

17. A piston and cylinder unit according to claim 15, wherein said stainless steel is X20 Cr13 steel.

18. A piston and cylinder unit comprising: a cylinder:
a piston arranged inside and being axially displaceable relative to said cylinder;
a cylinder end cover at one end of said cylinder, said end cover having a hole;
a tubular rod having a load end and a piston end, said rod having a bore extending substantially from said load end to said piston end, said bore having female threads extending from each of said ends toward the other of said ends, said rod piston end being threadably engaged to said piston, Said rod projecting away from said piston and extending through said end cover hole, said rod load end being threadably engaged to a load attachment means for attaching said rod to a load, said bore being adapted to receive a permanent magnet moving with said rod;
a switch positioned adjacent said cylinder and cooperating with said magnet, said magnets being axially adjustable in said bore.

19. A piston and cylinder unit according to claim 18, wherein said magnets are arranged slidably fitted in said bore, said magnets having a locking member for holding said magnets in place.

20. A piston and cylinder unit according to claim 19, wherein said magnet has a peripheral groove and said locking member includes a sprag in the form of a resin in said peripheral groove.

21. A piston and cylinder unit according to claim 19, wherein said locking member is in the form of one of a rubber ring, a plastic ring, and a spring ring on an outer periphery of said magnet.

* * * * *